(12) United States Patent
Zhou et al.

(10) Patent No.: US 7,708,446 B2
(45) Date of Patent: May 4, 2010

(54) DISPLAY FILM STACKS AND A METHOD OF MODELING THE FILMS

(75) Inventors: Jian Zhou, Evansville, IN (US); Kevin Patrick Capaldo, Midland, MI (US); Chung-hei Yeung, Midland, MI (US); Mahari Tjahjadi, Shanghai (CN); Andrei Sharygin, Mount Vernon, IN (US)

(73) Assignee: Sabic Innovative Plastic IP B.V. (NL)

( * ) Notice: Subject to any disclaimer, the term of this patent is extended or adjusted under 35 U.S.C. 154(b) by 56 days.

(21) Appl. No.: 12/037,386

(22) Filed: Feb. 26, 2008

(65) Prior Publication Data

US 2009/0219461 A1    Sep. 3, 2009

(51) Int. Cl.
*F21V 7/04* (2006.01)

(52) U.S. Cl. .................. 362/618; 362/619; 362/606

(58) Field of Classification Search ................. 362/561, 362/600, 606, 607, 610, 615, 616, 618, 619, 362/620; 349/58, 60, 65, 67, 70
See application file for complete search history.

(56) References Cited

U.S. PATENT DOCUMENTS

| | | | |
|---|---|---|---|
| 3,492,249 | A | 1/1970 | Pezarro et al. |
| 5,592,332 | A | 1/1997 | Nishio et al. |
| 5,598,280 | A | 1/1997 | Nishio et al. |
| 5,870,224 | A | 2/1999 | Saitoh et al. |
| 5,885,490 | A | 3/1999 | Kawaguchi et al. |
| 5,971,559 | A | 10/1999 | Ishikawa et al. |
| 6,088,067 | A | 7/2000 | Willett et al. |
| 6,169,633 | B1 | 1/2001 | Watanabe |
| 6,208,466 | B1 | 3/2001 | Liu et al. |
| 7,092,163 | B2 | 8/2006 | Bastawros et al. |
| 7,213,933 | B2 | 5/2007 | Chang et al. |

(Continued)

FOREIGN PATENT DOCUMENTS

EP    1767962 A1    3/2007

(Continued)

OTHER PUBLICATIONS

Japanese Patent No. 2007133196A; Publication Date: May 31, 2007; Abstract Only; 1 Page.

(Continued)

*Primary Examiner*—Jacob Y Choi
(74) *Attorney, Agent, or Firm*—Cantor Colburn LLP

(57) ABSTRACT

Disclosed herein is a display film stack for a backlight display system. In one embodiment, the display system comprises: a light source, a first film comprising a first surface texture layer that is formed of a first material of a first refractive index, and a second film comprising a second surface texture layer that is formed of a second material of a second refractive index. The second film is disposed between the light source and the first film. The second refractive index is greater than the first refractive index. The light source is disposed in optical communication with the first film and the second film. The first surface texture layer and the second surface texture layer comprise unit structures independently selected from the group consisting of hemispherical structures, partial hemispherical structures, ellipsoidal structures, immersed spherical beads, ellipsoidal beads, "bell-shape" bump and complex lens shape structures.

17 Claims, 6 Drawing Sheets

U.S. PATENT DOCUMENTS

| | | | |
|---|---|---|---|
| 7,213,936 B2 | 5/2007 | Wang et al. | |
| 7,391,571 B2 * | 6/2008 | Lee et al. | 359/619 |
| 7,408,708 B2 | 8/2008 | Goto et al. | |
| 7,556,393 B2 | 7/2009 | Onishi et al. | |
| 2003/0086030 A1 | 5/2003 | Taniguchi et al. | |
| 2003/0169504 A1 | 9/2003 | Kaminsky et al. | |
| 2004/0027672 A1 | 2/2004 | Bourdelais et al. | |
| 2004/0076391 A1 * | 4/2004 | Ghoshal et al. | 385/123 |
| 2005/0248848 A1 | 11/2005 | Whitehead et al. | |
| 2006/0002675 A1 * | 1/2006 | Choi et al. | 385/129 |
| 2006/0182049 A1 | 8/2006 | Rokui | |
| 2006/0256580 A1 | 11/2006 | Kang et al. | |
| 2006/0274244 A1 | 12/2006 | Battiato et al. | |
| 2007/0002583 A1 * | 1/2007 | Lee et al. | 362/606 |
| 2007/0070648 A1 * | 3/2007 | Kim | 362/600 |
| 2007/0159699 A1 | 7/2007 | Wang et al. | |
| 2007/0236940 A1 | 10/2007 | Kuroda et al. | |
| 2007/0242479 A1 | 10/2007 | Ohta et al. | |
| 2007/0263292 A1 | 11/2007 | Ha et al. | |
| 2008/0186738 A1 * | 8/2008 | Kim et al. | 362/620 |
| 2008/0192484 A1 | 8/2008 | Lee et al. | |
| 2008/0232132 A1 | 9/2008 | Graf et al. | |
| 2008/0291361 A1 * | 11/2008 | Weber | 349/62 |
| 2009/0129115 A1 * | 5/2009 | Fine et al. | 362/606 |
| 2009/0161385 A1 * | 6/2009 | Parker et al. | 362/618 |

FOREIGN PATENT DOCUMENTS

| | | |
|---|---|---|
| JP | 4275502 A | 1/1992 |
| JP | 2007133196 A | 5/2007 |
| JP | 2007179035 A | 7/2007 |
| WO | 9959007 A1 | 11/1999 |
| WO | 2007142438 A1 | 12/2007 |
| WO | 2008100058 A1 | 8/2008 |

OTHER PUBLICATIONS

Japanese Patent No. 2007179035A; Publication Date: Jul. 12, 2007; Abstract Only; 1 Page.

Japanese Patent No. 4275502A; Publication Date: Oct. 1, 1992; Abstract Only; 1 Page.

International Search Report; International Application No. PCT/US2009/035003; International Filing Date: Feb. 24, 2009; Date of Mailing: May 6, 2009; 7 Pages.

Flat Panel Display Measurements Standard, Version 2.0; Video Electronics Standards Association, Display Metrology Committee; Jun. 1, 2001; 2 Pages.

Written Opinion of the International Searching Authority; International Application No. PCT/US2009/035003; International Filing Date: Feb. 24, 2009; Date of Mailing: May 6, 2009; 8 Pages.

* cited by examiner

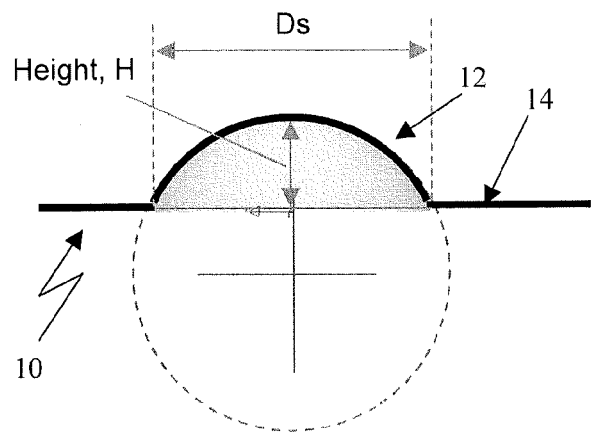 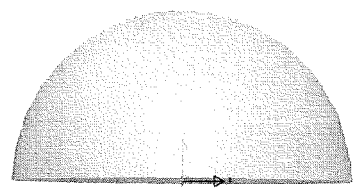
Figure 2A  Figure 2B
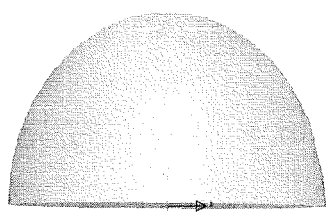 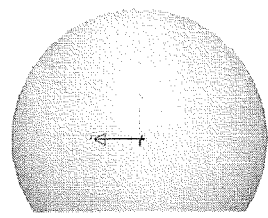
Figure 2C  Figure 2D
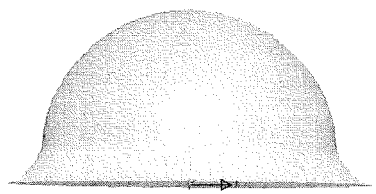 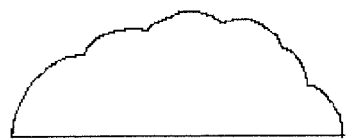
Figure 2E  Figure 2F

DISPLAY FILM STACKS AND A METHOD OF MODELING THE FILMS

BACKGROUND

This disclosure generally relates to a display film stack for back lighting of flat panel display systems, and a method of modeling a display film stack to enhance on-axis luminance.

Display films are used in a variety of applications, such as part of displays or lighting devices. Regardless of the application, display films can be used to improve the efficiency of the light transmitted from a light source to an output by redirecting the light.

One technology that has gained attention in display technologies is liquid crystal (LC) technology. An LC display (LCD) includes a liquid crystal material that is modulated to provide a light-valve function. In many LCD applications, it is useful to improve the power efficiency. Increasing the power efficiency of an LCD (or other similar display) can be useful in improving the image quality of the display, among other benefits.

Conventional LCD backlights for large displays have conventionally employed multiple lamps to provide sufficient brightness over a large area. Typically, these directly illuminated backlights are used for television and large display applications and contain linear arrays of fluorescent lamps with reflectors. In order to provide a uniform intensity profile from the surface of the backlight before passing through the LCD panel, display film(s) are used to "spread-out" or diffuse the light from the linear array of fluorescent lights so as to eliminate the visibility of linear "hot spots" or non-uniformities in the backlight luminance. Such a display film can include a surface texture to aid in the diffusion. This surface texture can be shaped and arranged to redirect light in an LCD, making the LCD more energy efficient.

Light collimating capability and the overall light efficiency are important components of any display system. Both of these factors, however, are affected by the surface texture of the display film as well as the refractive index of the material used to make the display film.

A conventional display film stack used for back lighting of flat panel displays can include a bottom diffuser to diffuse the input light and hide the lamps or reflective paint dots underneath the display film stack, and a prismatic film to collimate the light from the bottom diffuser of the display film stack to gain on-axis luminance. Examples of prismatic films include BEF made by 3M Company, and the like. Examples of diffuser films include D121 made by Tsujiden Company Ltd. of Japan, UTE II made by MNTech Company of Korea, PTR733 made by Shinwha Intertek Company of Korea, BE2039 made by General Electric®, and the like.

It is desirable to have a multiple-film stack that is optimally designed to better balance both the light collimating ability and the overall light efficiency of the stack to enhance the on-axis luminance of the backlight system.

BRIEF DESCRIPTION

Disclosed herein is a display film stack for a backlight display system. In one embodiment, the display system comprises: a light source, a first film comprising a first surface texture layer that is formed of a first material of a first refractive index, and a second film comprising a second surface texture layer that is formed of a second material of a second refractive index. The second film is disposed between the light source and the first film. The second refractive index is greater than the first refractive index. The light source is disposed in optical communication with the first film and the second film. The first surface texture layer and the second surface texture layer comprise unit structures independently selected from the group consisting of hemispherical structures, partial hemispherical structures, ellipsoidal structures, immersed spherical beads, ellipsoidal beads, "bell-shape" bump and complex lens shape structures.

The above described and other features are exemplified by the following figures and detailed description.

BRIEF DESCRIPTION OF THE DRAWINGS

Refer now to the figures, which are exemplary, not limiting, and wherein like numbers are numbered alike.

FIGS. 2A-2F are exemplary cross-sectional schematic diagrams illustrating partial-hemispherical, hemispherical, ellipsoidal, immersed spherical beads, "bell-shape" and complex lens shape unit structures.

DETAILED DESCRIPTION

Figure 1:
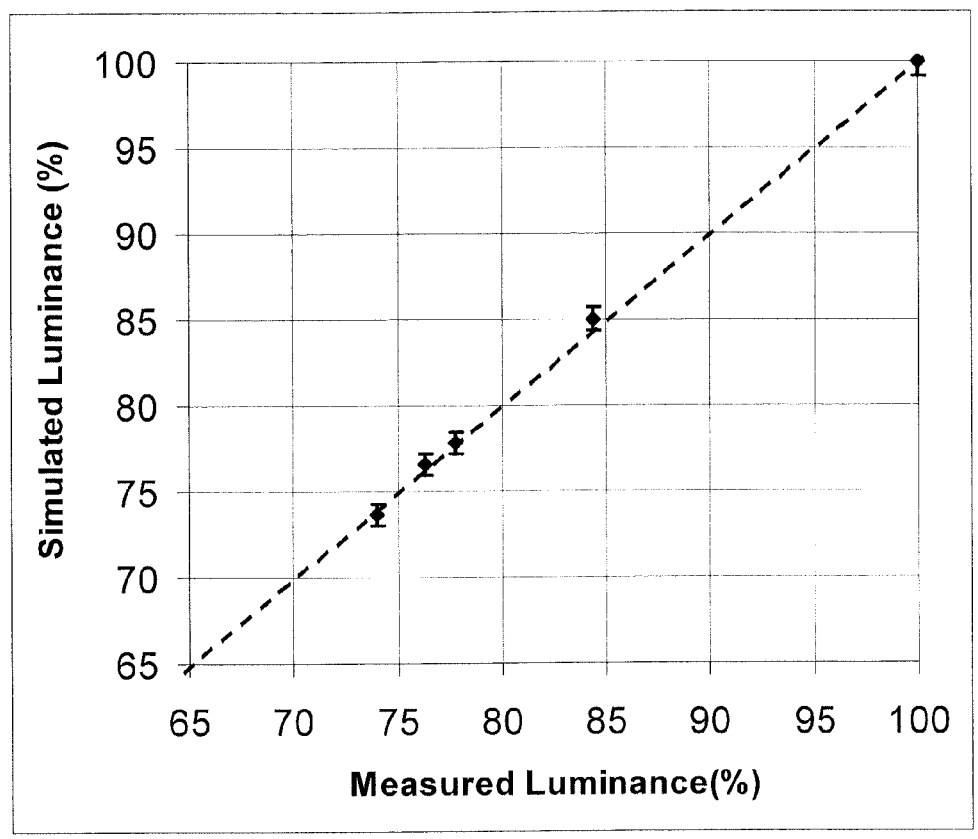
FIG. 1 is a plot showing correlation of the simulated luminance and experimentally measured luminance of several commercial diffuser film stacks.

Some configurations for back lighting systems can use multiple diffuser films to replace the stack containing the prismatic film. Each film in such a multiple diffuser stack can have a one-sided or two-sided engineered (i.e., textured) surface layer that not only diffuses the spatially non-uniform light input to achieve a spatially uniform light output, but also collimates the light to enhance the on-axis luminance of the display system. Luminance is experimentally determined using a Microvision luminance meter instrument (commercially available from Microvision company, US). The absolute luminance values (unit: candela per square millimeter ($Cd/mm^2$)) depend on the back lighting sources. Herein, the relative luminance is obtained by comparing the absolute luminance of various display film stacks to a two D121 film stack (made by Tsujiden Corporation, Japan). Unless otherwise specified, the luminance data is obtained via simulation using the illumination design software, LightTools™ from Optical Research Associates. As shown in FIG. 1, the simulated luminance data of several commercial film stacks are validated by experimental measurement. Luminance is measured using a Microvision Luminance meter (commercially available from Microvision Corporation, US).

In the above multiple diffuser film configurations, if all of the component films have the similar surface textures, the same or similar refractive indexes (RI) are also generally chosen for the surface textures. However, using different refractive index for the surface textures of the component films may optimize the on-axis luminance of the whole stack by balancing both the light collimating capability with the overall light efficiency of the stack, and may also lower the cost of the whole stack since more materials with different RI can be chosen for the surface textures of the component films to achieve the desired optical performance of the stack. Light efficiency is dictated by the overall transmission of the display film stack. A higher refractive index film, i.e., a more light collimating film, retro-reflects more amount of light, which is recycled back to a bottom reflector in the backlight system. During the recycle process, the light absorption loss along the light traveling path reduces the overall transmission of the system, and therefore, reduces the light efficiency of the stack. Unless specifically specified otherwise, the refractive index of transparent plastic materials is determined using a refractometer method based on ASTM D542-00 (2006 version).

In one embodiment of the display film configuration disclosed herein, film(s) with surface texture layer(s) of the higher refractive index material are disposed between film(s) with surface texture layer(s) of lower refractive index material and the bottom reflector film The surface textures of the component films comprise a plurality of partial hemispherical structures (FIG. 2A) and/or hemispherical structures (FIG. 2B), and/or ellipsoidal structures (FIG. 2C) and/or immersed spherical beads (FIG. 2D), and/or "bell-shape" structures (FIG. 2E), and/or complex lens shape (FIG. 2F). All of the unit structures are described in reference to FIG. 2. As can be seen from FIG. 2A, the structure 12 protrudes from the surface of a sheet 10 with the areas 14 adjacent to the structure 12 illustrated as substantially flat. A hemispherical structure corresponds to an aspect ratio of 0.5, while a partial hemispherical structure corresponds to an aspect ratio of less than 0.5, wherein the aspect ratio is the height (H) of the unit lens structure divided by the effective diameter ($D_s$) of the projected area of the unit lens structure on the film surface. The ellipsoidal structure corresponds to an aspect ratio of greater than 0.5 and an immersed spherical bead has aspect ratio of 0 to up to 1.0. Non-spherical bumps such as "bell-shape" (FIG. 2E) and complex lens shape (FIG. 2F) can also be used in the embodiments with aspect ratio from 0 to 1.0. It is noted that the flat area 14 between the unit structures in a lens array texture is optional: for instance, the flat area does not exist when many unit structures packed very closely and merge into one big complex lens shape. The surface textures bearing any of these lens structures can both collimate and diffuse the incident light.

In one embodiment, the display system comprises: a light source, a first film comprising a first surface texture layer that is formed of a first material of a first refractive index, and a second film comprising a second surface texture layer that is formed of a second material of a second refractive index. The second film is disposed between the light source and the first film. The second refractive index is greater than the first refractive index. The light source is disposed in optical communication with the first film and the second film. The first surface texture layer and the second surface texture layer comprise unit structures independently selected from the group consisting of hemispherical structures, partial hemispherical structures, ellipsoidal structures, immersed spherical beads, ellipsoidal beads, "bell-shape" bump and complex lens shape structures. The first and/or second film can each contains a base layer that is formed by optically transparent polymeric material independently selected from the group consisting of polycarbonate, polyethylene terephthalate, polyethylene naphthalate, cycloolefin polymer, polyetherimide, polyalkylene, polyacetal, polystyrene, poly(meth)acrylates, polyetherimide, polyurethane, polyphenylene sulfide, polyvinyl chloride, polysulfone, polyetherketone, polyether etherketone, polyether ketone, and combinations comprising at least one of the foregoing polymeric material. The first and second film can each, independently, contain a surface texture layer that is formed either by the same material as the base layer material or a polymer formed from a monomer selected from the group consisting of epoxy(meth)acrylates, polyester (meth)acrylates, acrylic(meth)acrylates, polyether(meth) acrylates, urethane(meth)acrylates, fluorinated(meth)acrylates, and combinations comprising at least one of the foregoing monomers. The unit structures of the surface texture layer can comprise convex and/or concave lens having diameters of 1 micrometer to 1 millimeter, and height/diameter ratios of 0.05 to 1.0. The first film and an additional film(s) have a combined thickness of 100 micrometers to 3 mm. The backlight display can further comprise a liquid crystal display disposed on a side of the first film opposite the light source. The second refractive index is greater than or equal to 0.03 RI greater than the first refractive index, or, specifically, greater than or equal to 0.10 RI greater than the first refractive index, or, more specifically, greater than or equal to 0.20 RI greater than the first refractive index. The first film and/or second film can comprise a reflective polarizer layer. The unit structure can have an aspect ratio of less than or equal to 0.5, or specifically, less than or equal to 0.3. The first film and/or the second film comprise convex lenses on one side and concave lenses on an opposite side.

In another embodiment, the display film stack can have the same arrangement of refractive indexes for the component films as above, except that at least one of the surface textures of the component films possess a negative replica (i.e., concaved unit structure instead of convex structures) of the surface textures described above.

Surface texture layer may be on either or both sides of any of the component film(s), which can improve the hiding power and/or viewing angle performance of the stack versus the single-side textured film. There could also be light diffusing particles dispersed in the base layer of any of the component film(s) to enhance the hiding power of the stack. Moreover, one of the component films in the display film stack may contain a reflective polarizer layer sandwiched between the two surface layers of the film. In addition to the higher and lower RI films, additional film(s) can optionally be employed. For example, reflective polarizer layer(s) can be disposed between any desired configuration of the films.

Disclosed herein are display film configurations, more diffusing films comprising both light collimating and diffusing properties. The films can be a single layer of a polymeric material having a first side and a second side. One or both sides of the film layer can include a surface texture that both diffuses and collimates the light. Alternatively, the display film configuration(s) can be multilayered, with each film having one or two-sided surface texture. As used herein, the terms "diffuse" or "diffusing" are intended to include light scattering or diffusion by reflection, refraction or diffraction from surface textures, dispersed particles, or layers or regions of the display film stack. "Collimate" or "collimating" is defined herein as layers wherein more of the light rays exiting the layer are directed toward the surface normal of the layer. Collimation properties can be achieved by refractive structures such as prisms, cones, microlenses, pyramids, hemispherical structures, linear, circular, random, regular, semirandom, or planar arrays of the aforementioned structures, and the like.

Figure 3A:
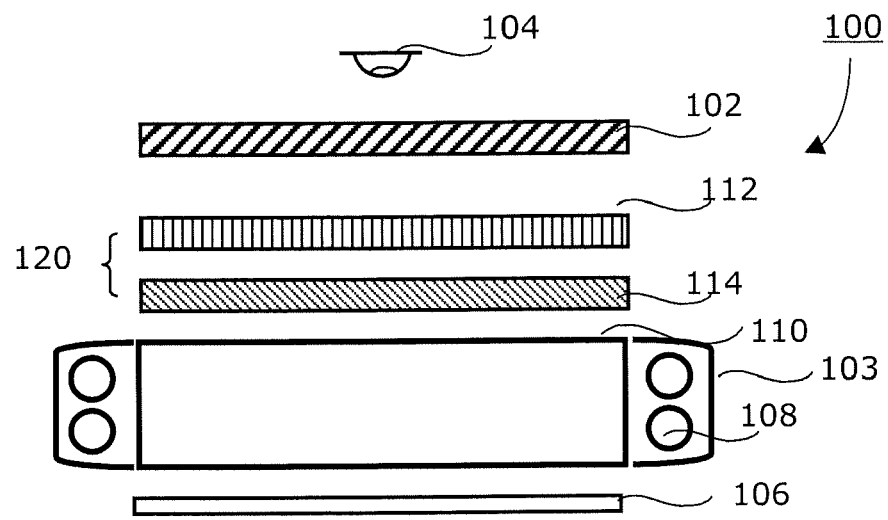
FIGS. 3A and 3B are cross-sectional exploded views of an exemplary display system including a display film stack.
Figure 3B:
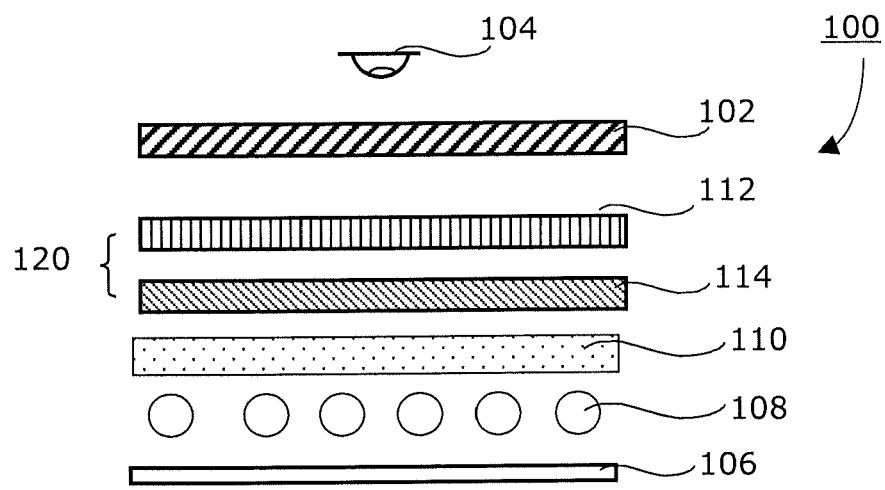

Referring now to FIG. 3, a cross-sectional, exploded view of an exemplary backlight display device generally designated 100 is illustrated. The backlight display device 100 includes multiple components arranged (e.g., stacked) in various combinations depending on the desired application. Generally, the backlight display device 100 can comprise two outer components with varying components disposed between the two outer components. For example, the backlight display device 100 can comprise a liquid crystal display (LCD) 102 defining an outer side closest to a viewer 104 of the backlight display device 100 and a reflective film 106 defining the second outer side. A light source 108 for generating light can be disposed between the LCD 102 and the reflective film 106, wherein the light source 108 can be in physical communication and/or optical communication with the reflective film 106. A light guide plate or diffuser plate 110 can be used to redirect the light emitted from the light source toward the viewer and generate more uniform illumination across the display surface. A display film stack 120 can be disposed between the LCD 102 and the reflective film 106 as shown such that the display film stack 120 can be in physical communication and/or optical communication with the light source 108. The display film stack 120 comprises at least two films, disposed between the light source 108 and the LCD 102. In an exemplary embodiment, the stack 120 includes a first film 112 and a second film 114. Each of the films 112 and 114 has a surface texture layer on at least one surface that both diffuse and collimate the light from light source 108 toward the viewer 104.

In an exemplary embodiment, the refractive index (RI) of each surface texture layer of the display film stack 120 can be different; in other words, the stack can be heterogeneous. Moreover, the surface texture layers can be configured (i.e., sequenced) such that the surface texture layer having the higher RI (in this case, the surface texture layer of film 114) is disposed between the light source 108 and the surface texture layer of the film 112 having the lower RI.

The number of films of the display film stack 120 can vary depending on the desired application, with two or more films used to attain the heterogeneous stack effect. Within the display film stack one or more of the films has surface texture(s) and is employed in a backlight display system such that the higher RI film layer is disposed closest to the light source. Optionally, the film can have convex top surface and concave bottom surface (e.g., the surface closer to the light source (e.g., light guide)), e.g., such that the double-side textured film has enhanced diffusing capability and hiding power compared to a single-side textured film.

While the display film stacks as disclosed herein are particularly suited for use in liquid crystal display systems (LCDs), it is to be understood that any reference to LCDs is made merely for ease in discussion and it is to be understood that other devices and applications are envisioned to be within the scope of this disclosure. For example, the display film stacks can be employed in any display device (e.g., a backlight display device), such as LCD televisions, laptop computers, instrument displays, and the like.

It has been unexpectedly discovered that the display film stacks disclosed herein have a combined film stack configuration (i.e., sequence) and surface texture that enhances the on-axis luminance of the display system compared to other configurations and geometries, thereby providing a significant commercial advantage. On-axis luminance describes the brightness of light on an axis normal to the display (e.g. to the LCD). Improving the on-axis luminance enhances the brightness of the light viewed by the user of the display, and allows the system to use less power to create a desired level of on-axis luminance.

For the display film stack comprising multiple light-collimating diffusers, the same texture and materials are sometimes chosen for the component films due to simplicity. In other cases where the films with different surface textures are used, in order to attain the maximum on-axis luminance, the stack has been configured in such a way that the higher-collimating film receives the light transmitted by the lower collimating film that is placed closer to the light source (the different collimating ability of the component films is mainly due to different geometry of the surface textures). However, optimization of on-axis luminance by optimizing the refractive indexes of the materials for the surface textures are not systemically considered for the whole stack in both of the above two cases. The higher refractive index for the surface texture of a single display film renders higher collimating capability of the film. It has been unexpectedly discovered, however, that with the texture surfaces constructed using the unit structures such as those described in FIG. 2, greater or equivalent luminance can be attained with a higher RI film(s) located between a lower RI film(s) and the light source as compared to the other configurations described in this paragraph. The increased on-axis luminance of the backlight system having a display film stack with such a configuration is unexpected because the lower RI film as a single film has less light-collimating capability than the higher RI film, would have been placed closer to the light source in order to maximize the on-axis luminance of the whole stack.

The difference in refractive index between the films (the higher refractive index film minus the lower refractive index film), can be greater than or equal to 0.03 RI, or, specifically, greater than or equal to 0.05 RI, or, more specifically, greater than or equal to 0.10 RI, or, yet more specifically, greater than or equal to 0.15 RI, and still more specifically, greater than or equal to 0.20 RI, and even greater than or equal to 0.25 RI.

Not to be limited by theory, the refractive index (RI) of a material directly affects the change in direction of light rays passing from one medium to another of different type, such as from air into a polymeric material. Based on Snell's law, when light travels through a medium with refractive index of $n_1$ and strikes another material with refractive index $n_2$ ($n_2 > n_1$) in a nonzero incident angle $\theta_1$, the light is bent towards the normal axis of the interface between the two mediums, i.e., $\theta_2 < \theta_1$.

$$n_1 \sin \theta_1 = n_2 \sin \theta_2$$

This is why the texture surface with higher RI has higher light collimating abilities. Increasing the RI of the texture surface of a diffuser film therefore increases the output light intensity along the normal axis of the display (on-axis intensity). But increasing the RI also decreases the overall light transmission of the film stack. A reduction in overall transmission tends to decrease the on-axis luminance of the display film stack.

A light-collimating display film typically reflects some incident light back to the light source (e.g., light guide, light box, etc.) underneath the display film stack. That light can be recycled by reflective surface at the bottom of the display system. A fraction of the retro-reflected light can be absorbed by the reflective surface and base film material of the display films when the light has multiple passes between the display film stack and the reflective surface. The unexpected effect of the display film stack configuration is due to the improved overall transmission of the stack when the higher RI surface texture layer is disposed closest to the light source and beneath the lower RI surface texture layer, compared to display film stacks using the same film compositions in a reverse configuration of the surface texture layers with high and low RI. The display film stacks as disclosed herein improve the on-axis luminance of backlight systems by optimally balancing the competing properties of light intensity with overall transmission.

The commercial advantage of this discovery is that display film stacks having different RI for some (or each) of the component films can be used to achieve substantially the same or better on-axis luminance of current display systems using the same or similar refractive index for each component film. This extends the range of selection of each component film for designing or constructing a display film stack. In the commercial market, LCD displays are divided into a class system based on the on-axis luminance of the display. Typically, LCD displays are designed to operate at the bottom of the luminance range for a given class in order to save power, use less bulbs in the light source, and the like. The display film stacks as disclosed herein can provide an increase or equivalent in on-axis luminance over display systems employing homogeneous RI films or film configurations with lower RI films disposed beneath the higher RI film. The benefits of such an improvement can be significant in maintaining an LCD display in a particular class bracket with the optimized material cost for the whole display stack.

The disclosed base film layer (i.e., the substrate for the surface texture layer) of the diffuser film can be formed from an optically transparent polymeric material. Some polymeric materials include polyalkylenes, polycarbonates (PC), polynorborene, cycloolefin polymer, polyesters, poly(meth) acrylates (i.e., polyacrylates, and polymethacrylates), polyacetals, polystyrene, polyetherimides (PEI), polyurethanes, polyphenylene sulfides, polyvinyl chlorides, polysulfones, polyetherketones, polyether etherketones, polyether ketone ketones, and combinations comprising at least one of the foregoing. For example, the material can be polyethylene terephthalate (PET), acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether, as well as combinations comprising at least one of the foregoing polymers. Examples of polycarbonates and their respective refractive indices include, bisphenol A polycarbonate (BPA-PC) having a RI of 1.586, bis-(4-hydroxyphenyl)methane-polycarbonate (BHPM-PC) having a RI of 1.556, a poly((isophthalate-terephthalate-resorcinol ester)-co-(bisphenol A polycarbonate)) (ITR-BPA-PC) in a molar ratio of 20:80 with an RI of 1.592, a 90:10 molar ratio ITR: BPA-PC polymer with an RI of 1.625, Ultem® 1010 PEI (commercially available from SABIC Innovative Plastics LLC US, Pittsfield, Mass.) with an RI of 1.660, and Ultem® XH6050 PEI (commercially available from SABIC Innovative Plastics LLC US) with an RI of 1.666.

The display film made using the above listed base film materials can have engineered surface texture layer on one or both sides of the film. The engineered surface texture can be of the same material as the base film material (monolithic) or different material if the surface texture layer is formed using a coating process. The coating materials forming the surface texture layer can include (meth)acrylates, such as epoxy (meth)acrylates, polyester(meth)acrylates, acrylic(meth) acrylates, polyether(meth)acrylates, urethane(meth)acrylates, fluorinated(meth)acrylates, and combinations comprising at least one of the foregoing materials. Such coating layers can be cured thermally, or with ultraviolet (UV) and/or electron beam (EB) energy.

Figure 4:
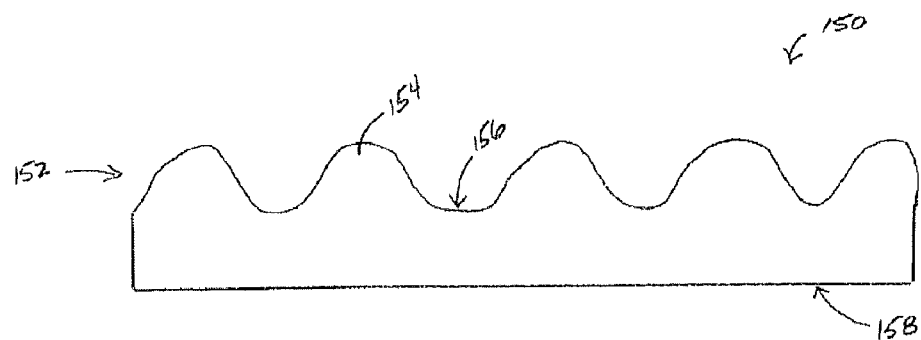
FIG. 4 is a cross-sectional perspective view of one layer of a display film stack having a textured top surface.

FIG. 4 illustrates an exemplary embodiment of a display film stack layer 150. The layer 150 includes a textured top surface 152 having a plurality of projecting portions 154 and a plurality of trough portions 156. The average height and width of the plurality of projecting portions 152 can vary depending on the desired light collimating or diffusing ability for the display film stack layer 150. The projecting portions 154 and the trough portions 156 are distributed on the top surface 152 to obtain a desired slope angle distribution, which will depend upon the preferred application of the display film stack 150. The second side, or bottom surface 158 of the layer 150, does not have surface texture. In another embodiment, the layer 150 can have a surface texture on the second side 158 of the layer 150.

The texture of the top surface 152 can be made by methods that include, without limitation, micro-replication coating, hot-embossing, injection molding, film calendaring, and the like. For example, when film calendaring, a cylindrical roller can have a surface texture with the desired slope angle distribution of projecting portions. When the cylindrical roller contacts the first side, i.e. top surface 152, of the layer 150, the cylindrical roller forms a surface texture on the plastic layer. Optionally, the film can be heated to a predetermined temperature before passing over the cylindrical roller to form the textured top surface.

Figure 5:
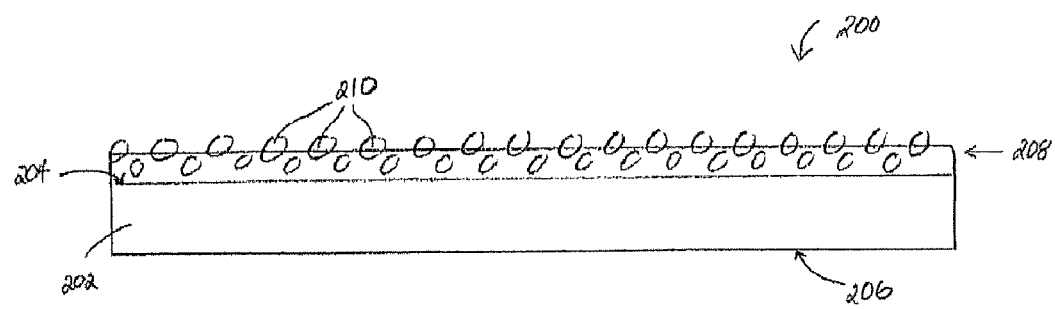
FIG. 5 is a cross-sectional perspective view of one layer of a display film stack having a coating layer containing particles and beads.

Turning now to FIG. 5, an exemplary embodiment of a display film stack 200 is illustrated. The film 200 includes a base polymeric material layer 202 having a top surface 204 (i.e., a first side) and a bottom surface 206 (i.e., a second side). Disposed on the top surface 204 of the base layer 202 is a coating layer 208. The coating layer 208 can include transparent beads or particles 210 to direct or diffuse light along the viewing axis (i.e., normal to the display). The coating layer 208 can include, without limitation, epoxy acrylates, polyester acrylates, acrylic acrylates, polyether acrylates, urethane acrylates, fluorinated acrylates, and combinations of the foregoing acrylates. Such coating layers can be cured thermally, or with ultraviolet (UV) and/or electron beam (EB) energy. For example, an exemplary UV-curable coating layer 208 can comprise, among other materials, a monomeric (meth)acrylate, oligomeric(meth)acrylate, and a photoinitiator.

In one embodiment, the coating layer 208 can include macroscale, microscale, light-directing transparent beads or particles 210 to create a light-collimating surface texture. Macroscale beads or particles can have a size of approximately 1 millimeter (mm) to about 1 meter (m) or the entire size of the film being formed; i.e. of a size scale easily discerned by the human eye. Microscale beads can have a size of less than or equal to about 1 mm, or, more specifically, greater than 1 micrometer to about 1 mm. Some possible beads or particles can include various geometries such as spheres, hemispheres, ellipsoids, cube-corners (e.g., triangular pyramid), trihedral or polyhedral shape, or the like, as well as combinations of the foregoing.

The composition used in the films can further include various additives that do not substantially adversely affect the desired film properties. Possible additives include impact modifiers, fillers, stabilizers (e.g., heat stabilizers, light stabilizers, and so forth), antioxidants, mold release agents, lubricants, flame retardants, anti-drip agents, optical brighteners, and combinations of the foregoing. The additives can be present in an amount effective to impart the desired effect to the display film stack. For example, the additive can be present in an amount of about 0.001 wt % to about 10 wt %, based on a total weight of the particular film.

A display film can have a thickness of about 50 micrometer (μm) to about 1 mm, while a display film stack can have a thickness of about 100 micrometers to about 3 mm.

Examples of particular requirements for backlight display applications can include, without limitation, on-axis luminance, view angle, hiding power, cost, and the like. Cost objective considerations can include, without limitation, cost of film materials, tooling and manufacturing costs, non-idealities of materials, and the like. One example of a cost objective is determining the type of material for the film. Reflective polarizer film layers cost more than light-collimating prism film layers, which in turn cost more than light-diffusing film layers. Examples of model design choices include, without limitation, refractive index, transmission, surface texture geometry, and film system designs, such as the order of placement of the films (i.e. film configuration or sequence).

The films and display film stacks are further illustrated by the following non-limiting examples.

EXAMPLES

The results given in Table 1 and 2 are produced from a simulation. The data in Comparative Example 1 (Table 3) is based on U.S. patent application Ser. No. 11/056,455, filed on Feb. 11, 2005, entitled Optical Films of Differing Refractive Indices.

Throughout the examples, the unit cell of the microlens array texture is partial hemispherical or hemispherical. The comparative data of prismatic film stack is also given. It is noted that the surface texture layers in Examples 1-4 are constructed with convex microlens array, but the same principle also applies for the textures with concave microlens array because the overall light collimating capability is determined by the surface slope distribution of the surface texture layer, which is the same for the textures that is the negative copy of the original texture. It is also noted that the number of films in the display film stack and refractive index values in the following examples are only illustrative. Clearly additional films and film having different refractive index values other than what are specified in the examples may also be chosen. In Examples 1 through 4, for simplicity of illustration, it is assumed that the surface texture layers of the component films of a multiple-film display film stack have the same geometry. In the cases where the surface texture layers of the component films have different geometry and different RI of surface textures, the same principle still applies because it helps to determine the preferred refractive index configuration of the textured layers (i.e., sequence) that can maximize the on-axis luminance.

All of the following luminance and overall transmission data are modeling results obtained using Monte-Carlo ray-tracing approach. The number of the rays traced for all individual cases are 2 million, the estimated error for the on-axis luminance is 0.8%. Hence, 1% luminance difference seen in Table 1 and 2 are not significant, but 3% difference is significant.

The following coating samples were prepared to demonstrate the range of refractive indices that can be achieved for the surface textures by using a coated layer on top of the polymeric substrate. In this study, three samples (A, B and C) of clear UV-curable coatings were prepared and polycarbonate (BPA-PC) film was used as a substrate. The coating and substrate thicknesses were varied from 10 micrometers to 100 micrometers and 100 micrometers to 500 micrometers, respectively. The coatings were cured using a F300 UV processor available from Fusion UV Systems, Inc.

Sample A comprises 50 weight percent (wt %) fluorinated acrylate oligomer (CN4000—available from Sartomer Co.®); 49 wt % 1,6-hexanediol diacrylate (SR238—available from Sartomer Co.®); 1 wt % 2-Hydroxy-2-methyl-1-phenyl propanone (HDMAP—available from Cytec Surface Specialties, Inc®). The refractive index of the Sample A formulation was 1.402.

Sample B comprises 60 weight percent (wt %) siliconized urethane acrylate (CN990) available from Sartomer Co.®; 39 wt % phenylthio ethyl acrylate (PTEA) (available from Bimax Chemicals Ltd®); 1 wt % bis(2,4,6-trimethylbenzoyl)-phenylphosphineoxide (Irgacure 819 available from Ciba Co.®). The refractive index of the Sample B formulation was 1.505.

Sample C comprises 39.5 wt % PTEA (Bimax); 59.5 wt % brominated epoxy acrylate (RDX51027 available from Cytec Surface Specialties, Inc®); 1 wt % Irgacure 819. The refractive index of the Sample C formulation was 1.583.

Example 1

Figure 6:
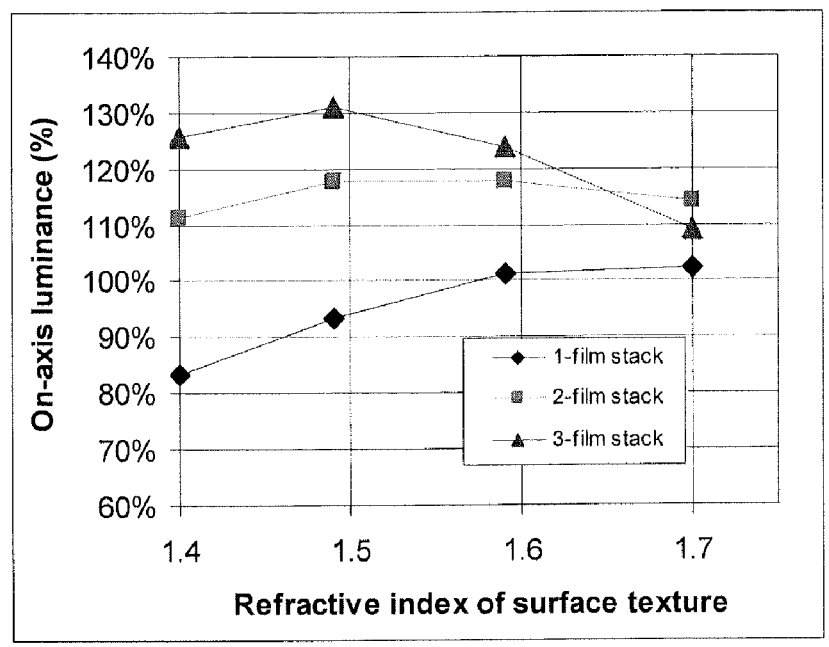
FIG. 6 graphically illustrates the effects of varying refractive indices of the surface texture of a display film stack on the on-axis luminance, wherein the texture surface of each component display film has a plurality of hemispherical lens with an aspect ratio of 0.5.
Figure 7:
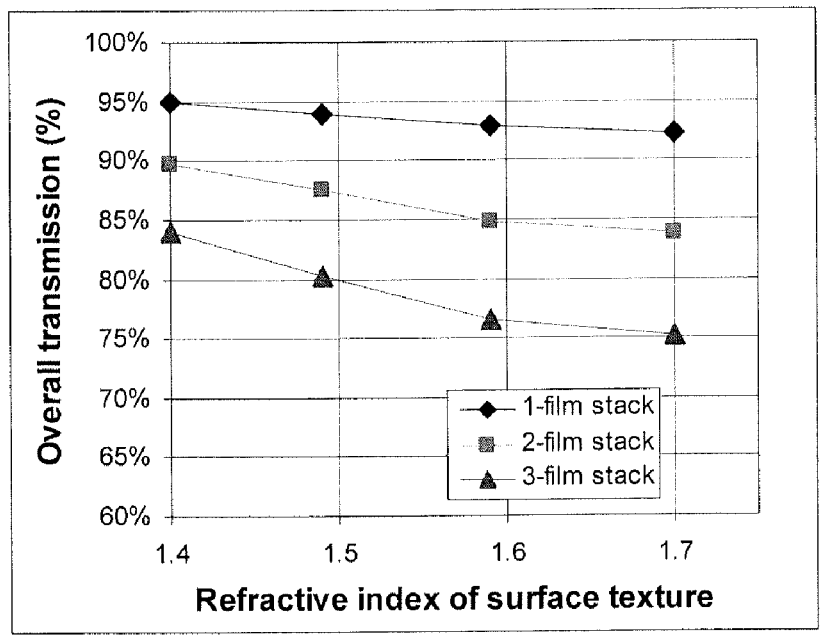
FIG. 7 graphically illustrates the effects of varying refractive indices of the texture surfaces of a display film stack on the overall transmission of the film, wherein the texture surface layer of each component display film has a plurality of hemispherical lens with an aspect ratio of 0.5.

A film stack contained a single, two, or three diffuser films that had the same surface texture geometry and the same refractive index. Each film was constructed with a surface texture layer on the top side of the polycarbonate base film. The top side means the side that is opposite to the light source of backlighting unit. The geometry of the texture layers was a microlens array whose unit cell was hemispherical bumps having a diameter of 50 micrometers, and an aspect ratio of about 0.5. The refractive index of the texture layers was 1.40 to 1.70. The effects of different refractive indices upon the on-axis luminance and the overall transmission of the three stack configurations are shown in FIGS. 6 and 7 respectively. The maximum on-axis luminance for the single-film stack in this example occurs at the highest RI (1.70). For the two-film and three-film stacks, however, the maximum on-axis luminance occurs at medium RI levels.

Example 2

Figure 8:
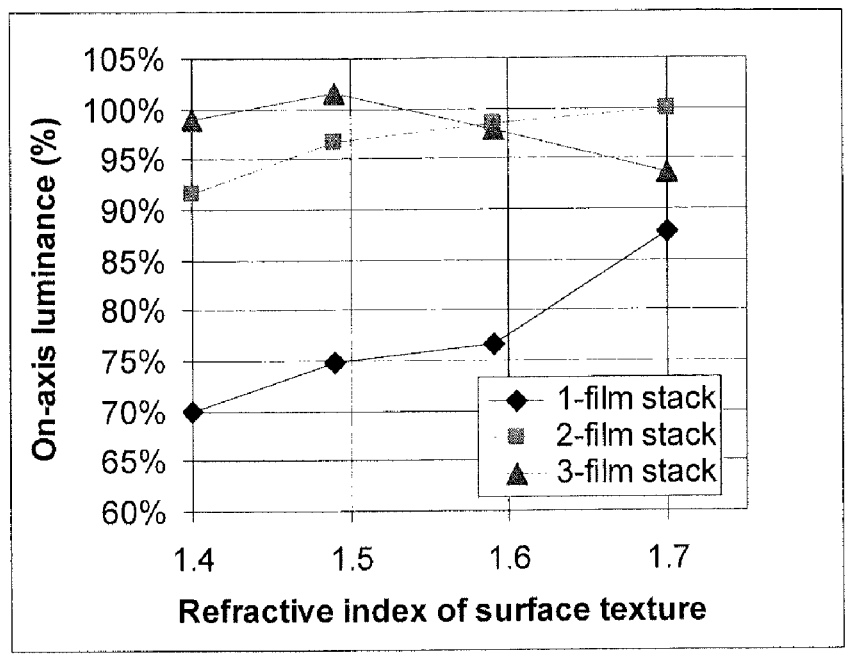
FIG. 8 graphically illustrates the effects of varying refractive indices of the surface texture of a display film stack on the on-axis luminance, wherein the texture surface of each component display film has a plurality of hemispherical lens with an aspect ratio of 0.3.
Figure 9:
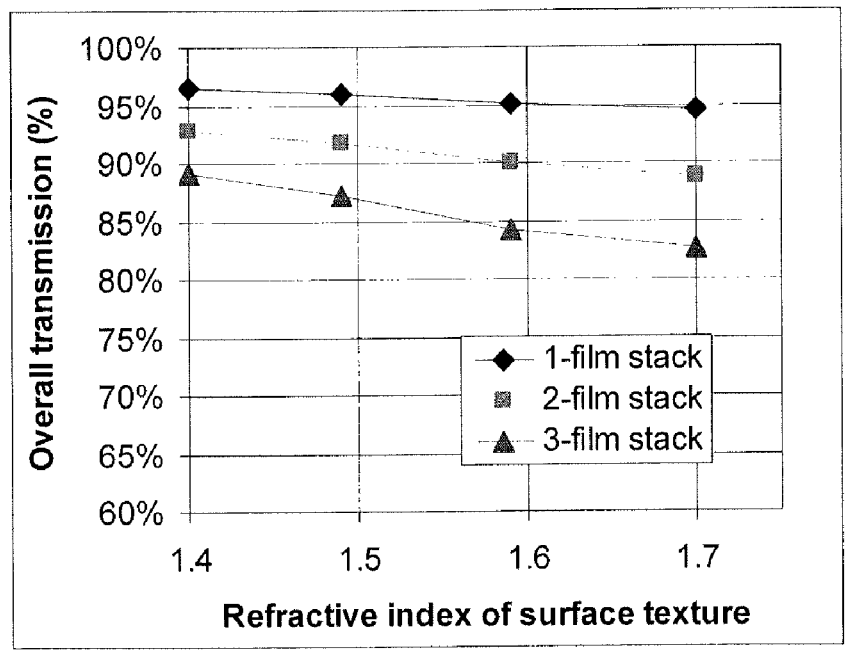
FIG. 9 graphically illustrates the effects of varying refractive indices of the texture surfaces of a display film stack on the overall transmission of the film, wherein the texture surface layer of each component display film has a plurality of hemispherical lens with an aspect ratio of 0.3.

The process of Example 1 was repeated except that the aspect ratio of the bumps was 0.3 (partial hemispherical). The effects of different refractive indices of the texture layer upon the on-axis luminance and the overall transmission of the single film, 2-film and 3-film display film stack configurations are shown in FIGS. 8 and 9. The maximum on-axis luminance for the single-film stack and two-film stack occurs at the highest RI (1.70). For the three-film stack, however, the maximum on-axis luminance occurs at medium RI levels (about 1.5). Comparing Example 1 and Example 2 illustrates how changing the geometry of the texture layer effects the optimal RI of maximum on-axis luminance.

Example 3

A two-film display film stack was constructed, wherein each of the two films had the same surface texture geometry. Each film was constructed with a single-sided texture layer on the top side of a polycarbonate base film. The geometry of the texture layer was a microlens array whose unit cell was the hemispherical bumps having a diameter of 50 micrometers, and an aspect ratio of about 0.5. The refractive index of the texture layer was varied between 1.40 and 1.70. For four refractive indexes (1.4, 1.49, 1.586, and 1.7) there were a total of 16 ($4^2$) different combinations of the refractive indexes for such a 2-film stack configuration. The results of the on-axis luminance and overall transmission of the 2-film stack for each RI combination are summarized in Table 1.

TABLE 1

| Combination Number | RI Layer Configuration (Bottom-Top) | On-axis luminance (%) | Overall transmission (%) |
|---|---|---|---|
| 1 | 1.4-1.4 | 111 | 89.7 |
| 2 | 1.49-1.49 | 118 | 87.4 |
| 3 | 1.54-1.54 | 120 | 86.0 |
| 4 | 1.586-1.586 | 118 | 84.9 |
| 5 | 1.7-1.7 | 114 | 83.7 |
| 6 | 1.4-1.49 | 113 | 88.6 |
| 7 | 1.49-1.4 | 114 | 88.6 |
| 8 | 1.4-1.586 | 116 | 87.4 |
| 9 | 1.586-1.4 | 119 | 87.4 |
| 10 | 1.4-1.7 | 111 | 86.9 |
| 11 | 1.7-1.4 | 113 | 86.9 |
| 12 | 1.49-1.586 | 119 | 86.3 |
| 13 | 1.586-1.49 | 120 | 86 |
| 14 | 1.49-1.7 | 115 | 85.4 |
| 15 | 1.7-1.49 | 116 | 85.4 |
| 16 | 1.586-1.7 | 115 | 84.3 |
| 17 | 1.7-1.586 | 117 | 84.3 |

As shown in Table 1, three heterogeneous-RI configurations, combinations 9, 12, and 13 generated the equivalent on-axis luminance as the highest luminance obtained from the homogeneous-RI configurations, combinations 1 through 4. The heterogeneous-RI two-layer films offer a better balance of the light-collimating capability and overall transmission of the entire display film stack. Table 1 illustrates that it is not always necessary to use the homogeneous-RI configuration to obtain the best on-axis luminance, rather a heterogeneous combination of RI materials can be used to obtain the same or better luminance with at least one film of lower cost (e.g., the monolithic polycarbonate film with the same refractive index of 1.586 for both the surface texture and base film may be of lower cost than a coated film) material. Moreover, in each heterogeneous-RI combination, the configuration having the higher of the two RI materials disposed on the bottom generated a higher on-axis luminance than their inversely configured counterpart. For example, combination 9 generated a 3% improvement in on-axis luminance over its counterpart, combination 8 (wherein the lower RI layer is disposed beneath the higher RI layer). Table 1 illustrates the unexpected improvement in on-axis luminance by disposing the higher RI film layer closest to a light source in a display film stack.

Example 4

A two-film stack was produced as in Example 3, wherein each of the two films had the same surface texture geometry. However, in this example, the aspect ratio of the bumps were 0.3 (partial hemispherical). Again, the refractive index of the texture layer was 1.40 to 1.70. For four refractive indexes (1.4, 1.49, 1.586, 1.7) there were a total of 16 ($4^2$) different combinations of the refractive indexes for such a 2-layer display film stack configuration.

TABLE 2

| Combination Number | Refractive Index Layer Configuration (Bottom-Top) | On-axis luminance (%) | Overall transmission (%) |
|---|---|---|---|
| 18 | 1.4-1.4 | 92 | 92.9 |
| 19 | 1.49-1.49 | 97 | 91.7 |
| 20 | 1.586-1.586 | 99 | 90.0 |
| 21 | 1.7-1.7 | 100 | 88.9 |
| 22 | 1.4-1.49 | 94 | 92.3 |
| 23 | 1.49-1.4 | 90 | 92.3 |
| 24 | 1.4-1.586 | 97 | 91.4 |
| 25 | 1.586-1.4 | 95 | 91.4 |
| 26 | 1.4-1.7 | 96 | 90.9 |
| 27 | 1.7-1.4 | 98 | 90.9 |
| 28 | 1.49-1.586 | 101 | 90.9 |
| 29 | 1.586-1.49 | 102 | 90.9 |
| 30 | 1.49-1.7 | 97 | 90.3 |
| 31 | 1.7-1.49 | 104 | 90.3 |
| 32 | 1.586-1.7 | 99 | 89.4 |
| 33 | 1.7-1.586 | 99 | 89.4 |

As shown in Table 2, the highest on-axis luminance of the four homogeneous combinations (18 through 21), was 100% for combination 21, which comprised the highest RI surface texture (1.70). Heterogeneous combinations 29 and 31 both generated higher on-axis luminance than combination 21 that has the highest luminance among the homogeneous-RI configurations. Like Table 1, Table 2 illustrates that it is not always necessary to use the homogeneous-RI configuration to obtain the best on-axis luminance, rather a heterogeneous combination of RI materials can be used to obtain the same or better luminance with at least one layer of lower cost (e.g., lower RI material typically has lower cost) material. Combination 31, which had the 1.7 RI layer disposed beneath a 1.49 RI layer, generated a 4% improvement in on-axis luminance over combination 21 (where two 1.7 RI layers were used). Employing a display film stack configured like that of combination 31 would result in a 4% better on-axis luminance display system at a reduced cost over a display film stack conventionally designed like combination 21 to include the highest RI materials. Even more surprising, is the results of combination 29. Combination 29 generated a 2% better on-axis luminance compared to combination 21, even though both the first and second film had lower refractive indexes (1.586 and 1.49 respectively) than the first and second film of combination 21 (1.7 each). This illustrates, in some cases, that on-axis luminance of heterogeneous stack configurations can even be improved over homogeneous configurations having overall higher RI films, when the configuration of the heterogeneous stack disposes the texture layer with higher RI beneath the other texture layer with lower RI.

Comparative Example 1

A two-film stack was produced, wherein each of the two films had the same prismatic surface texture except that the orientation of the prisms within the two film textures are orthogonal to each other. The refractive index of the prismatic texture was 1.49 to 1.85. The results of the on-axis luminance of such 2-film stacks for various RI combinations are summarized in Table 3.

TABLE 3

| Combination Number | Refractive Index Layer Configuration (Bottom-Top) | On-axis luminance gain (%) |
|---|---|---|
| 34 | 1.49-1.49 | 0.0 |
| 35 | 1.59-1.59 | 30.3 |
| 36 | 1.66-1.66 | 58.5 |
| 37 | 1.71-1.71 | 76.1 |
| 38 | 1.80-1.80 | −2.8 |
| 39 | 1.85-1.85 | −74.3 |
| 40 | 1.49-1.70 | 40.8 |
| 41 | 1.70-1.49 | 30.3 |
| 42 | 1.49-1.85 | 72.5 |
| 43 | 1.85-1.49 | 58.5 |
| 44 | 1.59-1.85 | 72.5 |
| 45 | 1.85-1.59 | 69.0 |

As shown in Table 3, the highest on-axis luminance gain that is relative to the combination 34 among all of the RI combinations is achieved by one of the homogeneous RI configuration, which was 76.1% for combination 37. Heterogeneous combinations 40 through 45 generate lower on-axis luminance than the highest luminance among the homogeneous-RI configurations. This is different result from those in Table 1 and Table 2 where heterogeneous combination of RI materials can generate the same or better luminance than the highest luminance from the homogeneous-RI configurations.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. As used herein, the term "(meth)acrylate" encompasses both acrylate and methacrylate groups.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A backlight display system, comprising:
    a light source;
    a first film comprising a first surface texture layer that is formed of a first material of a first refractive index; and
    a second film comprising a second surface texture layer that is formed of a second material of a second refractive index, wherein the second film is disposed between the light source and the first film;
    wherein the second refractive index is greater than the first refractive index;
    wherein the light source is disposed in optical communication with the first film and the second film; and
    wherein the first surface texture layer comprises unit structures selected from the group consisting of hemispherical structures, partial hemispherical structures, ellipsoidal structures, immersed spherical beads, ellipsoidal beads, "bell-shape" bump and complex lens shape structures; and
    wherein the second surface texture layer comprises unit structures selected from the group consisting of hemispherical structures, partial hemispherical structures, ellipsoidal structures, immersed spherical beads, ellipsoidal beads, "bell-shape" bump and complex lens shape structures.

2. The backlight display system of claim 1, wherein the first and second film each contains a base layer that is formed by optically transparent polymeric material selected from the group consisting of polycarbonate, polyethylene terephthalate, polyethylene naphthalate, cycloolefin polymer, polyetherimide, polyalkylene, polyacetal, polystyrene, poly(meth)acrylates, polyetherimide, polyurethane, polyphenylene sulfide, polyvinyl chloride, polysulfone, polyetherketone, polyether etherketone, polyether ketone, and combinations comprising at least one of the foregoing polymeric material.

3. The backlight display system of claim 2, wherein the first and second film each, independently, contain a surface texture layer that is formed either by the same material as the base layer material or a polymer formed from a monomer selected from the group consisting of epoxy(meth)acrylates, polyester (meth)acrylates, acrylic (meth)acrylates, polyether (meth)acrylates, urethane (meth)acrylates, fluorinated (meth)acrylates, and combinations comprising at least one of the foregoing monomers.

4. The backlight display system of any of claim 1, wherein the unit structures of the surface texture layer comprise convex and/or concave lens having diameters of 1 micrometer to 1 millimeter, and height/diameter ratios of 0.05 to 1.0.

5. The backlight display system of any of claim 1, wherein the first film and an additional film have a combined thickness of 100 micrometers to 3 mm.

6. The backlight display system of any of claim 1, further comprising a liquid crystal display disposed on a side of the first film opposite the light source.

7. The backlight display system of any of claim 1, wherein the second refractive index is greater than or equal to 0.03 RI greater than the first refractive index.

8. The backlight display system of claim 1, wherein the second refractive index is greater than or equal to 0.10 RI greater than the first refractive index.

9. The backlight display system of claim 1, wherein the second refractive index is greater than or equal to 0.20 RI greater than the first refractive index.

10. The backlight display system of any of claim 1, wherein the first film and/or second film comprises a reflective polarizer layer.

11. The backlight display system of any of claim 1, wherein unit structures have an aspect ratio of less than or equal to 0.5.

12. The backlight display system of claim 1, wherein the aspect ratio is less than or equal to 0.3.

13. The backlight display system of any of claim 1, wherein the first film and/or the second film comprise convex lenses on one side and concave lenses on an opposite side.

14. A backlight display system, comprising:
a light source;
a first film comprising a first surface texture layer that is formed of a first material of a first refractive index;
a second film comprising a second surface texture layer that is formed of a second material of a second refractive index, wherein the second film is disposed between the light source and the first film; and
a liquid crystal display disposed on a side of the first film opposite the light source;
wherein the second refractive index is greater than the first refractive index;
wherein the light source is disposed in optical communication with the first film and the second film; and
wherein the first surface texture layer comprises unit structures selected from the group consisting of hemispherical structures, partial hemispherical structures, ellipsoidal structures, immersed spherical beads, ellipsoidal beads, "bell-shape" bump and complex lens shape structures;
wherein the second surface texture layer comprises unit structures selected from the group consisting of hemispherical structures, partial hemispherical structures, ellipsoidal structures, immersed spherical beads, ellipsoidal beads, "bell-shape" bump and complex lens shape structures; and
wherein the second refractive index is greater than or equal to 0.10 RI greater than the first refractive index.

15. The backlight display system of claim 14, wherein the second surface texture layer comprises unit structures that are located on a surface of the second film that is opposite the light source.

16. A backlight display system, comprising:
a light source;
a first film comprising a first surface texture layer that is formed of a first material of a first refractive index;
a second film comprising a second surface texture layer that is formed of a second material of a second refractive index, wherein the second film is disposed between the light source and the first film; and
a liquid crystal display disposed on a side of the first film opposite the light source;
wherein the second refractive index is greater than the first refractive index;
wherein the light source is disposed in optical communication with the first film and the second film; and
wherein the first surface texture layer comprises unit structures selected from the group consisting of hemispherical structures, partial hemispherical structures, ellipsoidal structures, immersed spherical beads, ellipsoidal beads, "bell-shape" bump and complex lens shape structures;
wherein the second surface texture layer comprises unit structures selected from the group consisting of hemispherical structures, partial hemispherical structures, ellipsoidal structures, immersed spherical beads, ellipsoidal beads, "bell-shape" bump and complex lens shape structures; and
wherein the unit structures have an aspect ratio of less than or equal to 0.5.

17. The backlight display system of claim 16, wherein the second surface texture layer comprises unit structures that are located on a surface of the second film that is opposite the light source.

\* \* \* \* \*